United States Patent
Hong (10) Patent No.: US 8,073,004 B2
(45) Date of Patent: Dec. 6, 2011

(54) METHOD AND RELATED DEVICE FOR REDUCING DATA TRANSITION IN DATA TRANSMISSION INTERFACE

(75) Inventor: Jion-lou Hong, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 869 days.

(21) Appl. No.: 12/123,484

(22) Filed: May 20, 2008

(65) Prior Publication Data

US 2009/0185579 A1    Jul. 23, 2009

(30) Foreign Application Priority Data

Jan. 17, 2008 (TW) ................. 97101767 A (51) Int. Cl.
*H04L 12/66* (2006.01)
*H04J 3/16* (2006.01)
(52) U.S. Cl. .................... 370/463; 370/471
(58) Field of Classification Search .......... None
See application file for complete search history.

(56) References Cited

U.S. PATENT DOCUMENTS

2004/0052375 A1* 3/2004 Craft et al. .............. 380/256
2004/0054830 A1* 3/2004 Craft et al. .............. 710/107

OTHER PUBLICATIONS

Stan, Bus-Invert Coding for Low Power I/O, IEEE Transactions on Very Large Scale Integration (VLSI) Systems, Mar. 1995, p. 49-58, vol. 3, No. 1.

* cited by examiner

*Primary Examiner* — Steven H Nguyen
(74) *Attorney, Agent, or Firm* — Winston Hsu; Scott Margo (57) ABSTRACT

Reducing data transitions in a data transmission interface includes receiving first data and second data, among which the first data is data being transmitted by the data transmission interface and the second data is next data of the first data in a timing sequence. Corresponding data bits of the first data and the second data are compared to compute how many data bits undergo data transition. If the number of data bits undergoing data transition is greater than half the number of data bits the data transmission interface is capable of transmitting simultaneously, an encoding mode is activated to encode the second data, and an encoding result corresponding to the second data is outputted.

14 Claims, 6 Drawing Sheets

METHOD AND RELATED DEVICE FOR REDUCING DATA TRANSITION IN DATA TRANSMISSION INTERFACE

BACKGROUND OF THE INVENTION

1. Field of the Invention

The present invention relates to a method and related device for reducing data transition of a transmission end in a data transmission interface, and more particularly, to a method and related device that determines whether to encode received data for reducing data transition by feeding back output data to compare with the received data.

2. Description of the Prior Art

A liquid crystal display (LCD) has advantages of low radiation, light weight and low power consumption. Thus, the LCD has gradually replaced conventional cathode ray tube (CRT) displays, and is widely used in various information technology products, such as a notebook computer, a personal digital assistant (PDA), a mobile phone, etc. In general, the LCD utilizes a timing controller to generate data signals corresponding to images being displayed, control signals, and clock signals needed to drive the LCD panel. Then, source drivers of the LCD can perform logic operations to generate driving signals of the LCD panel according to the data signals, the control signals and the clock signals. In order to suppress noise and reduce power consumption, data transmitted from the timing controller to the source drivers through data buses are usually in the form of differential signals. Common data transmission interfaces include a low voltage differential signal (LVDS) interface, a reduced swing differential signal (RSDS) interface, a mini low voltage differential signal (mini-LVDS), and so on.

Since the data transmitted in the form of differential signals alternates between 0 and 1, current signals carried on data lines of the data transmission interface also swing back and forth unceasingly. Thus, harmonics respectively belonging to different frequency bands are easily radiated in the form of electromagnetic waves, resulting in a problem of electromagnetic interference (EMI). Furthermore, with increasing demand for large-size, high-resolution, and high-speed transmission, not only is the number of data lines increased, but also data frequency of the data transmission interface is significantly enhanced, so that the EMI problem becomes more and more serious.

Figure 1:
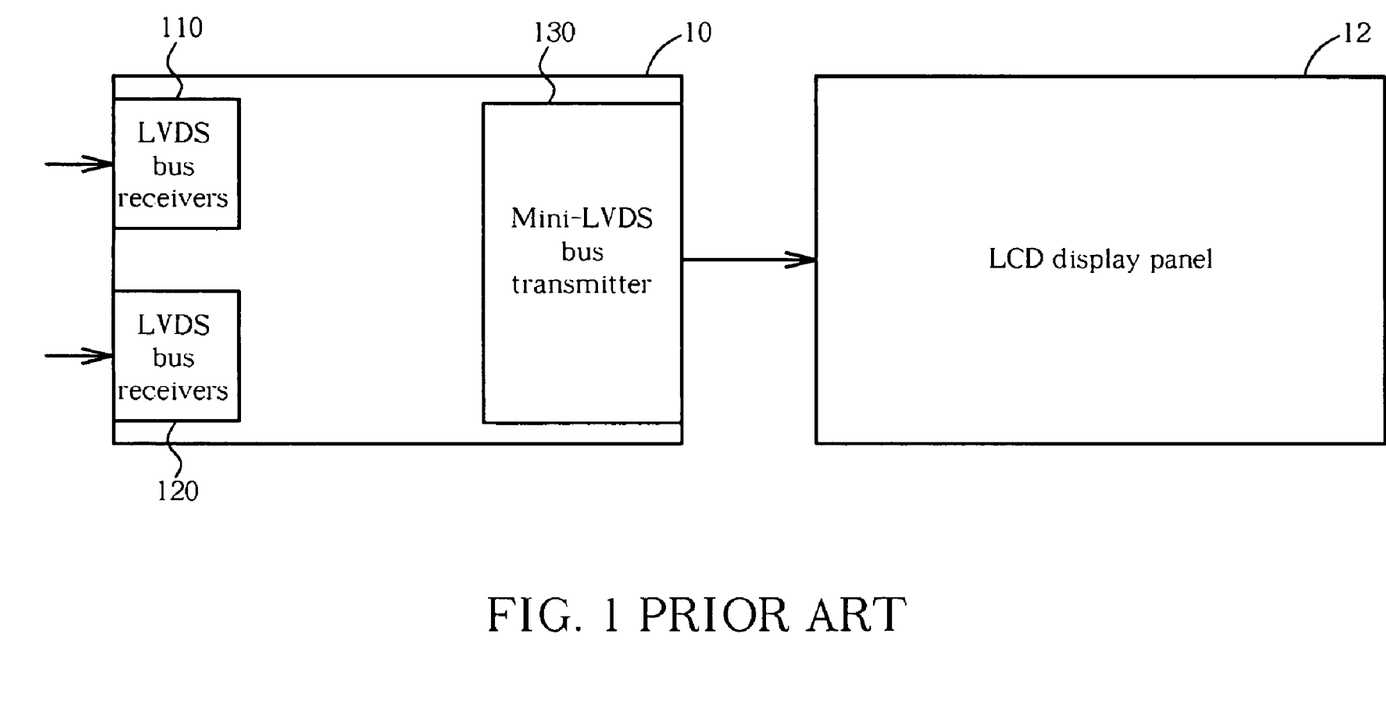
FIG. 1 is a schematic diagram of a prior art timing controller.

For example, please refer to FIG. 1. FIG. 1 is a schematic diagram of a prior art timing controller 10. The timing controller 10 is utilized for generating data signals corresponding to images being displayed on a display panel 12 and generating control signals and clock signals needed to drive the LCD panel 12. The timing controller 10 employs two LVDS bus receivers 110 and 120 as a data reception interface to receive data, and employs a mini-LVDS bus transmitter 130 as a data transmission interface to transmit the generated control signals, clock signals and image data to source drivers of the LCD panel 12. In this case, data frequency of the mini-LVDS bus transmitter 130 will be 3.6 times that of the LVDS bus receivers 110 and 120, and may be even as high as 270 megahertz when realized in high-resolution applications (such as 1680*1050). At this time, if there still exists unceasing alternation of the transmitted data, or data transition, in the data transmission interface, severe EMI problems will occur, which will affect image quality of the LCD panel 12.

Thus, if the number of data transitions occurring between transmitted data of the data transmission interface can be eliminated, the above-mentioned EMI problems can be improved effectively as well.

SUMMARY OF THE INVENTION

It is therefore an objective of the present invention to provide a method and related device for reducing data transition in a data transmission interface, so as to prevent electromagnetic interference.

According to the present invention, a method for reducing data transitions of a transmission end in a data transmission interface is disclosed. The data transmission interface is utilized for transmitting a plurality of data bits simultaneously. The method includes the steps of receiving first data and second data having a plurality of data bits, respectively, among which the first data is data being transmitted by the transmission end of the data transmission interface and the second data is next data of the first data in a timing sequence, comparing corresponding data bits of the first data and the second data to compute a number of data bits undergoing data transition between the first data and the second data, checking if the number of data bits undergoing data transition between the first data and the second data is greater than half the number of the plurality of data bits to determine a voltage level of a control signal, activating an encoding mode to encode the plurality of data bits of the second data when the voltage level of the control signal conforms to a first voltage level, and outputting an encoding result corresponding to the second data to the transmission end.

According to the present invention, an electronic device for reducing data transitions of a transmission end in a data transmission interface is further disclosed. The data transmission interface is utilized for transmitting a plurality of data bits simultaneously. The electronic device includes a data output terminal for outputting first data, among which the first data is data being transmitted by the transmission end of the data transmission interface and comprises a plurality of data bits; a data input terminal for receiving second data, among which the second data is next data of the first data in a timing sequence and comprises a plurality of data bits; a comparison unit, coupled to the data output terminal and the data input terminal, for comparing corresponding data bits of the first data outputted by the data output terminal and the second data received by the data input terminal to compute a number of data bits undergoing data transition between the first data and the second data; a determination unit, coupled to the comparison unit, for checking if the number of data bits undergoing data transition between the first data and the second data is greater than half of the number of the plurality of data bits to determine a voltage level of a control signal; and an encoding unit, coupled to the data input terminal, the determination unit and the data output terminal, for activating an encoding mode to encode the plurality of data bits of the second data when the voltage level of the control signal conforms to a first voltage level.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
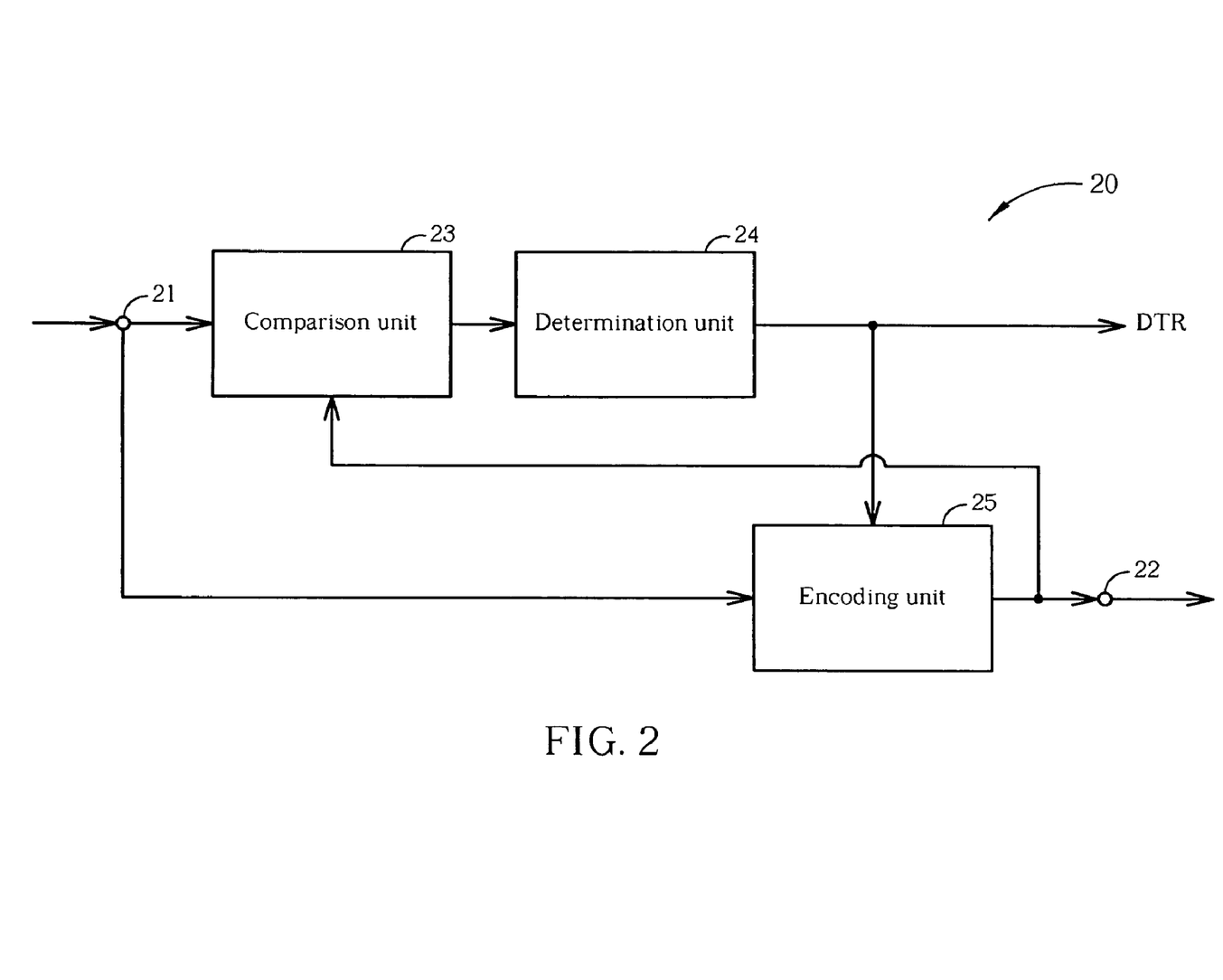
FIG. 2 is a functional block diagram of an electronic device for reducing data transition of a transmission end in a data transmission interface according to the present invention.

Please refer to FIG. 2. FIG. 2 is a functional block diagram of an electronic device 20 for reducing data transition of a transmission end in a data transmission interface according to the present invention. The data transmission interface is utilized for transmitting a plurality of data bits simultaneously, which can be a low voltage differential signal (LVDS) interface, a reduced swing differential signal (RSDS) interface, a mini low voltage differential signal (mini-LVDS) interface and etc. The electronic device 20 includes a data input terminal 21, a data output terminal 22, a comparison unit 23, a determination unit 24 and an encoding unit 25. For convenience, the following description utilizes first data to represent data outputted by the data output terminal 22, and utilizes second data to represent data received by the data input terminal 21. The first data and the second data are adjacent data being transmitted by the data transmission interface in timing sequence, and thus have the same number of data bits. The comparison unit 23 is coupled to the data input terminal 21 and the data output terminal 22, and is utilized for comparing corresponding data bits of the first data outputted by the data output terminal 22 and the second data received by the data input terminal 21 to compute the number of data bits undergoing data transition between the first data and the second data. The determination unit 24 is coupled to the comparison unit 23, and is utilized for checking if the number of data bits undergoing data transition between the first data and the second data is greater than half of the number of the plurality of data bits to determine a voltage level of a control signal DTR. The encoding unit 25 is coupled to the data input terminal 21, the determination unit 24 and the data output terminal 22, and is utilized for activating an encoding mode to encode the data bits of the second data when the voltage level of the control signal DTR conforms to a first voltage level, and outputting a corresponding result to the data output terminal 22.

Therefore, by feeding back the first data to compare with the second data, the electronic device 20 of the present invention can determine whether the number of data bits undergoing data transition between the first data and the second data is greater than half of the number of data bits capable of being transmitted simultaneously by the data transmission interface, so as to activate the encoding mode for encoding the second data. In this case, the number of data bits undergoing data transition between adjacent transmitted data of the data transmission interface must be less than half of the number of data bits capable of being transmitted by the data transmission interface, and thus problems of electromagnetic interference (EMI) can be improved effectively.

Preferably, the determination unit 24 can transform the voltage level of the control signal DTR to be a high logic level when the number of data bits undergoing data transition between the first data and the second data is greater than half of the number of the plurality of data bits; and conversely, can transform the voltage level of the control signal DTR to be a low logic level when the number of data bits undergoing data transition between the first data and the second data is less than half of the number of the plurality of data bits. Moreover, when the control signal DTR is transformed to the high logic level, the encoding unit 25 can then activate the encoding mode to perform an inverse operation for the data bits of the second data and output an encoding result through the data output terminal 22. As for the detailed operation of the electronic device 20, please refer to the following illustration.

Figure 3:
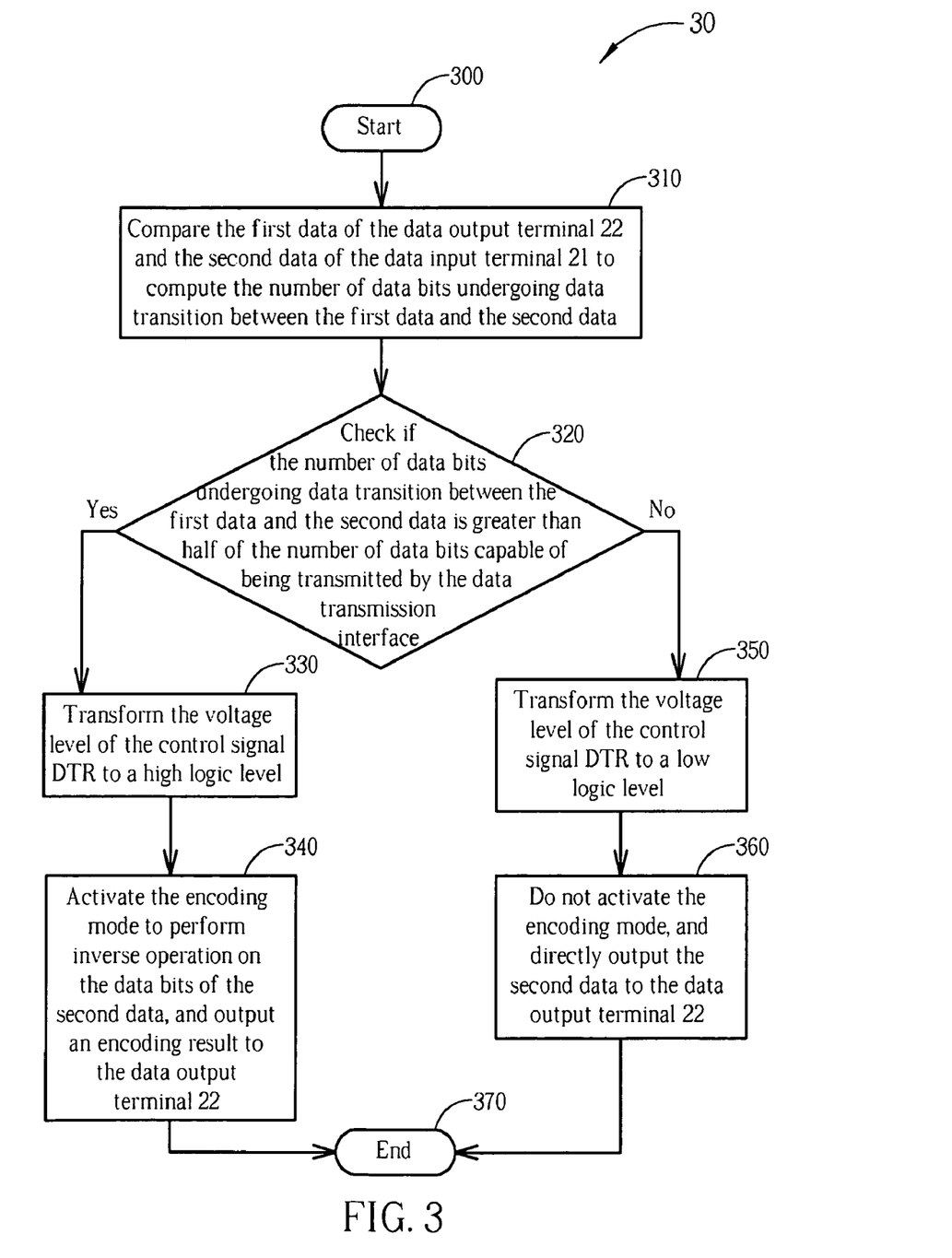
FIG. 3 is a schematic diagram of a process for reducing data transition of a transmission end in a data transmission interface according to an embodiment of the present invention.

Please refer to FIG. 3. FIG. 3 is a schematic diagram of a process 30 for reducing data transition of a transmission end in a data transmission interface according to an embodiment of the present invention. The process 30 is utilized for realizing operations of the electronic device 20, and includes the following steps:

Step 300: Start.

Step 310: Compare the first data of the data output terminal 22 and the second data of the data input terminal 21 to compute the number of data bits undergoing data transition between the first data and the second data.

Step 320: Check if the number of data bits undergoing data transition between the first data and the second data is greater than half of the number of data bits capable of being transmitted by the data transmission interface. If so, execute Step 330, and if not, execute Step 350.

Step 330: Transform the voltage level of the control signal DTR to a high logic level.

Step 340: Activate the encoding mode to perform inverse operation on the data bits of the second data, and output an encoding result to the data output terminal 22.

Step 350: Transform the voltage level of the control signal DTR to a low logic level.

Step 360: Do not activate the encoding mode, and directly output the second data to the data output terminal 22.

Step 370: End.

According to the process 30, the electronic device 20 first compares the first data of the data output terminal 22 and the second data of the data input terminal 21 to compute the number of data bits undergoing data transition between the first data and the second data. Then, the electronic device 20 determines whether the number of data bits undergoing data transition between the first data and the second data is greater than half of the number of data bits capable of being transmitted by the data transmission interface. If so, the voltage level of the control signal DTR is transformed to be high by the determination unit 24 of the electronic device 20. The high logic level of the control signal DTR enables the encoding unit 25 to activate the encoding mode for performing the inverse operation for the data bits of the second data and to output a corresponding encoding result to the data output terminal 22. Conversely, the low logic level of the control signal DTR is outputted by the determination unit 24, which will not enable the encoding unit 25 to activate the encoding mode but causes direct output of the second data to the data output terminal 22.

Namely, when the number of data bits undergoing data transition between the received data and the transmitted data is greater than half of the number of data bits capable of being transmitted by the data transmission interface, the present invention activates an encoding mode to perform the inverse operation for the received data for reducing occurrence of data transition when the consecutive data are transmitted by the data transmission interface; and conversely, when the number of data bits undergoing data transition between the received data and the transmitted data is less than half of the number of data bits capable of being transmitted by the data transmission interface, the present invention does not activate the encoding mode but directly outputs the received data. Therefore, the number of data bits undergoing data transition between two consecutive data transmitted by the data transmission interface must be less than half the number of data bits capable of being transmitted by the data transmission interface, so that EMI problems can be improved effectively. Preferably, the electronic device 20 of the present invention can be arranged into a timing controller of a liquid crystal display (LCD) for reducing data transitions occurring between transmitted data of the timing controller, and thus image quality of the LCD can be enhanced due to elimination of electromagnetic influences.

Figure 4:
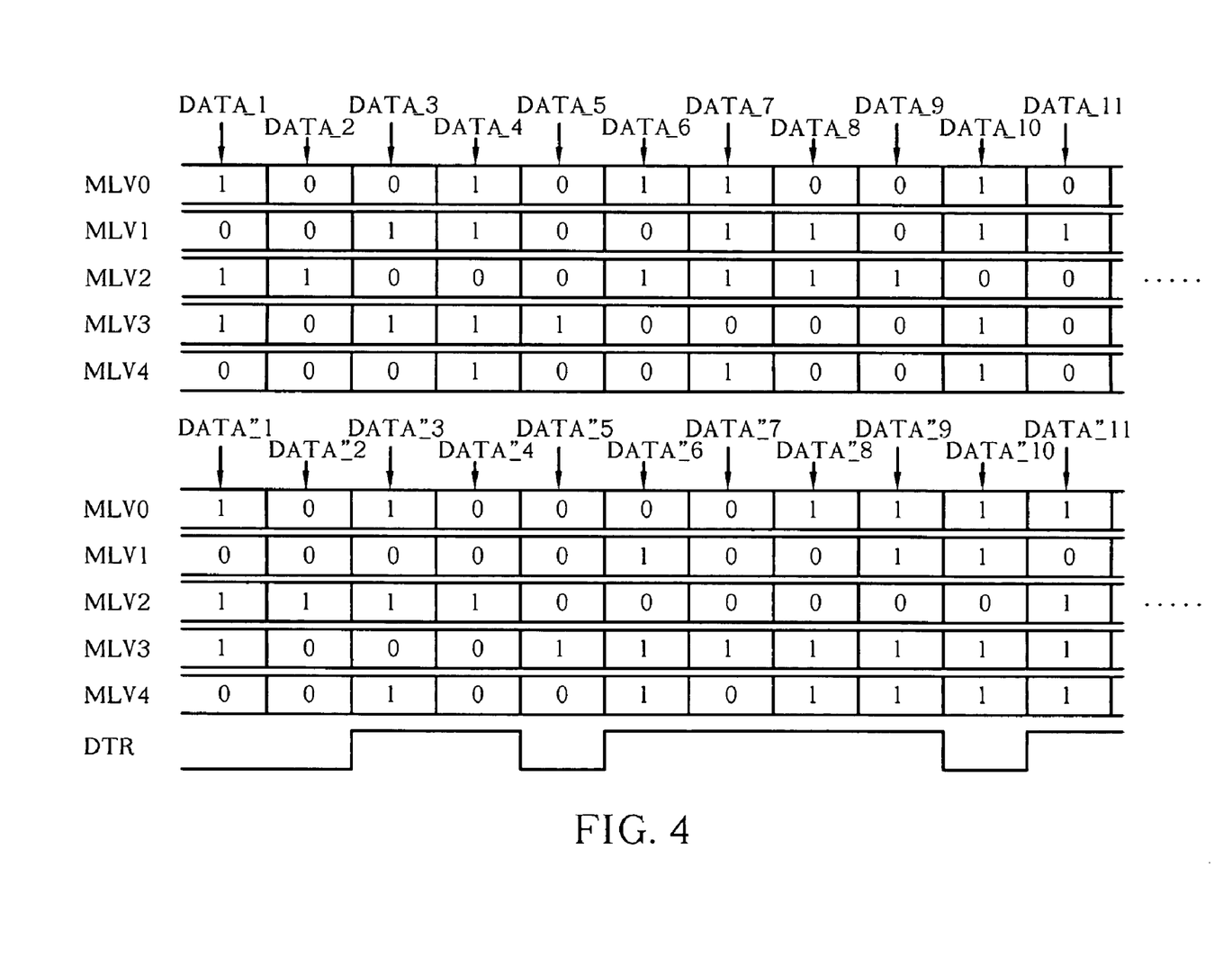
FIG. 4 is a schematic diagram of data transmitted through the electronic device of FIG. 2.

For example, please refer to FIG. 4. FIG. 4 is a schematic diagram of data transmitted through the electronic device 20 of the present invention. In FIG. 4, MLV_0 to MLV_4 represent 5 data bits capable of being transmitted simultaneously by the data transmission interface, DATA_1 to DATA_n represent data received by the data input terminal 21, DATA"_1 to DATA"_n represent data outputted by the data output terminal 22, and DTR represents the logic level of the control signal DTR. When the first data DATA_1 is received, since there is no outputted data fed back at this time, the first data DATA_1 may be directly outputted to the data output terminal 22. Then, data outputted by the data output terminal 22 can be fed back to compare with data received by the data input terminal 21 for determining whether to enable the encoding unit 25, so as to inversely output data received by the data input terminal 21. Taking the second data DATA_2 for example, since the number of data bits undergoing data transition from the first data DATA"_1 outputted by the data output terminal 22 is 2 (i.e. data bits MLV_0 and MLV_3), which is less than half the number of data bits capable of being transmitted by the data transmission interface, the control signal DTR is outputted to be a low logic level by the determination unit 24. In this case, the encoding unit 25 can not be enabled by the control signal DTR, and data bits of the second data DATA_2 will be directly outputted to the data output terminal 22.

As for the third data DATA_3, since the number of data bits undergoing data transition from the second data DATA"_2 outputted by the data output terminal 22 is 3, the determination unit 24 then transitions the voltage level of the control signal DTR to a high logic level for enabling the encoding unit 25, so as to inversely output data bits of the third data DATA_3 to the data output terminal 22. Similarly, since the number of data bits undergoing data transition between the third data DATA"_3 outputted by the data output terminal 22 and the received fourth data DATA_4 is 3, the voltage level of the control signal DTR remains at the high logic level state, and thus the fourth data DATA_4 would be inversely outputted to the data output terminal 22 by the encoding unit 25. The other data will be processed in like manner, and are not narrated herein.

Figure 5:
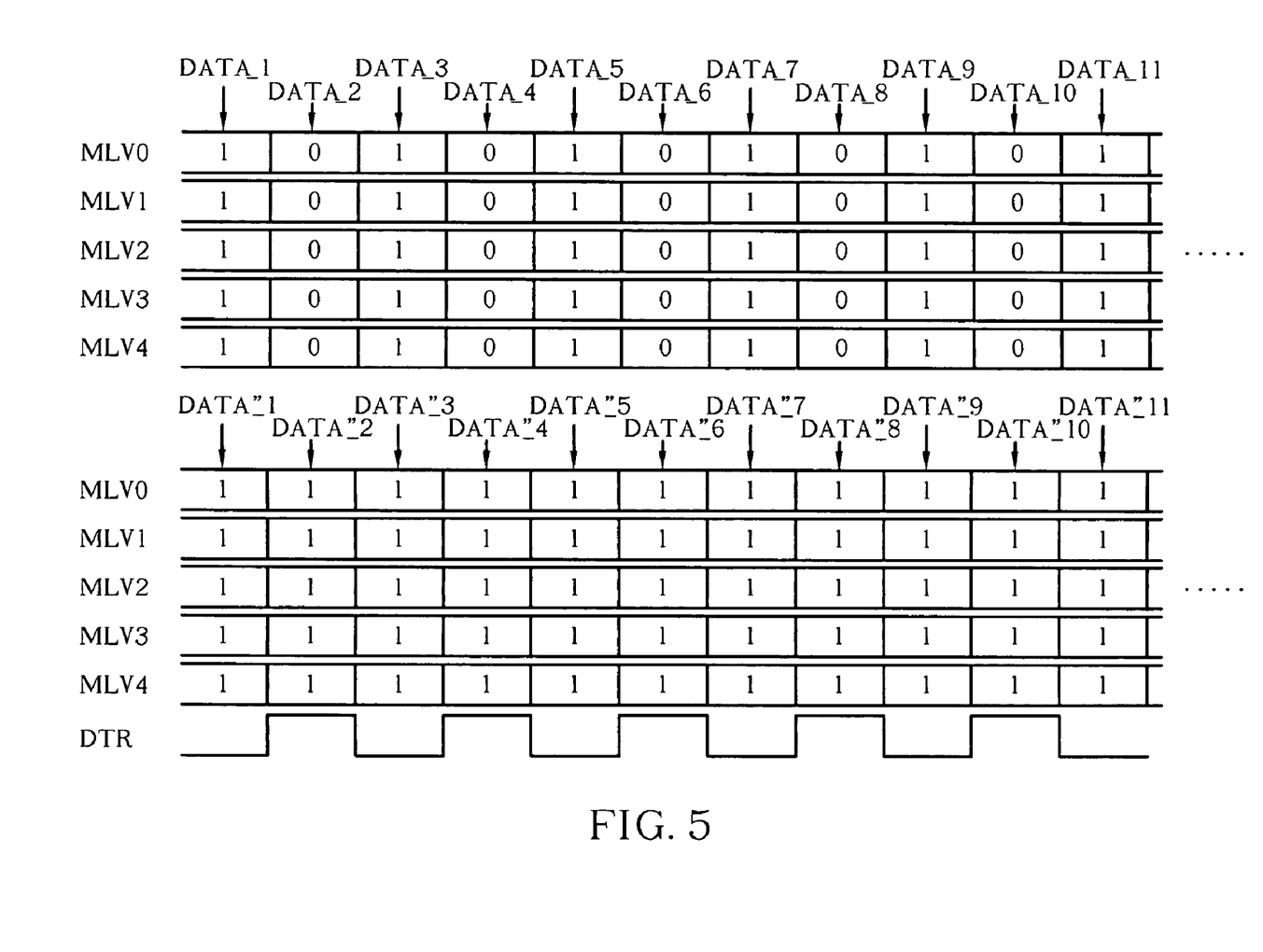
FIG. 5 and FIG. 6 are schematic diagrams of other data transmitted through the electronic device of FIG. 2.
Figure 6:
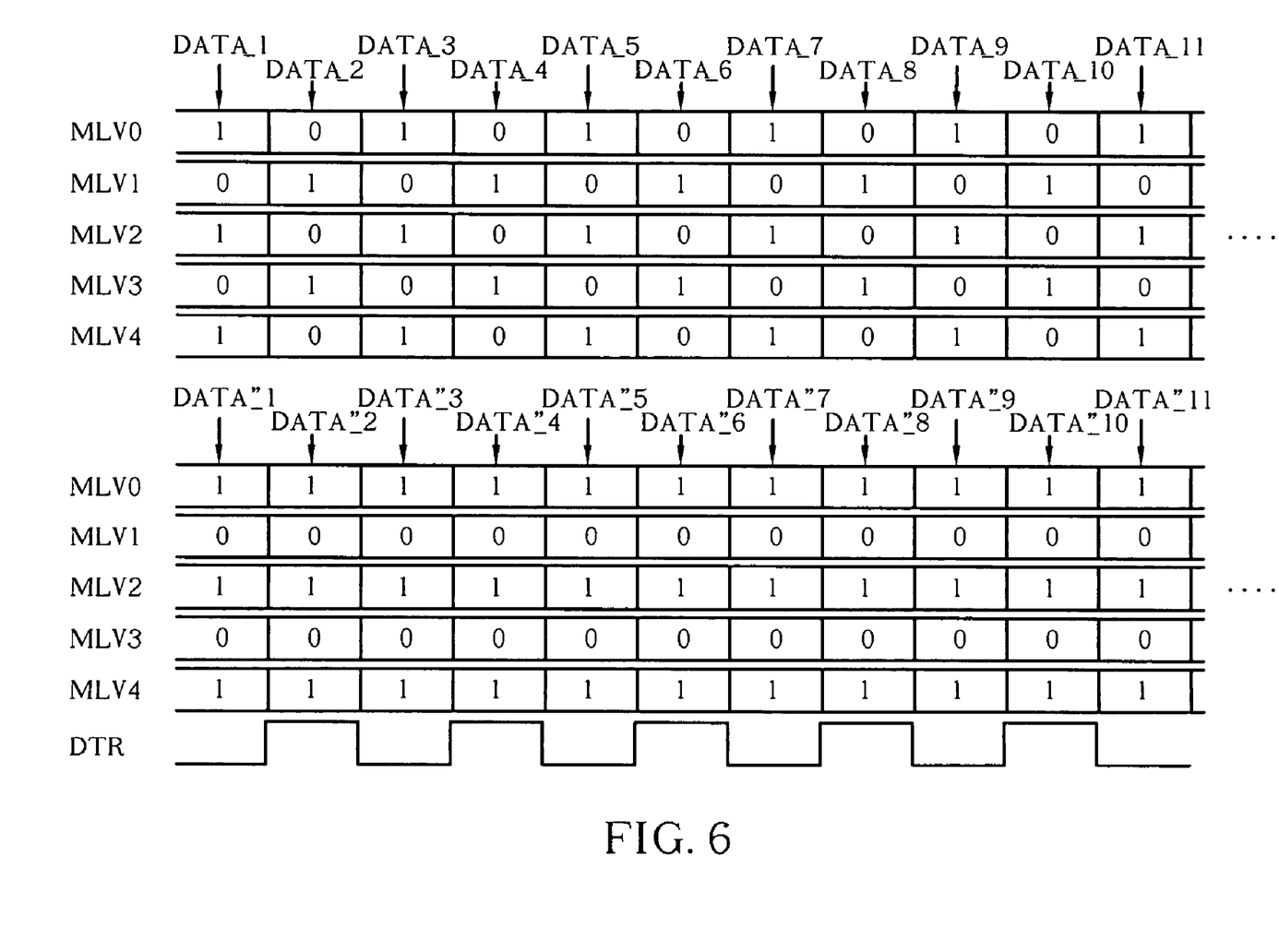

As shown in FIG. 4, the number of data bits undergoing data transition between two adjacent data of processed data DATA"_1 to DATA"_n must be less than half of the number of data bits capable of being simultaneously transmitted by the data transmission interface. Therefore, compared with the data DATA_1 to DATA_n, when the processed data DATA"_1 to DATA"_n are consecutively transmitted by the data transmission interface, data transitions occurring between the transmitted data can be improved effectively, so as to eliminate the electromagnetic interference. Please further refer to FIG. 5 and FIG. 6. FIG. 5 and FIG. 6 are schematic diagrams of other data transmitted through the electronic device 20 of the present invention, which illustrate two worst cases in which data transition occurs between the data being transmitted by the data transmission interface. Apparently, after processing by the present invention, no data transition occurs between the transmitted data of the data transmission interface.

Certainly, the present invention can simultaneously transmit the logic level of the control signal DTR and the encoded data to a reception end of the data transmission interface, so that the reception end can decode and restore the original data according to the logic level of the control signal DTR. Related communication measures are well known by those skilled in the art, and thus not narrated herein. Additionally, please note that the above-mentioned electronic device 20 is merely an exemplary illustration of the present invention, and thus those skilled in the art can utilize any hardware or software to realize the electronic device 20. For example, the comparison unit 23 may be realized by a comparator and an accumulator, and the encoding unit 25 may be realized by an inverter, which all belongs to the scope of the present invention.

As mentioned above, the present invention feeds back output data for comparison with received data for determining whether the number of data bits undergoing data transition between the output data and the received data is greater than half the number of data bits capable of being transmitted by the data transmission interface, so as to enable an encoding mode to encode the received data. Therefore, when the output data are consecutively transmitted by the data transmission interface, the number of data bits undergoing data transition between two adjacent transmitted data must be less than half of the number of data bits capable of being transmitted by the data transmission interface, which can significantly improve the EMI problems. Preferably, the present invention can be realized in a timing controller of an LCD for reducing data transitions occurring between transmitted data of the timing controller, so that image quality of the LCD can be enhanced due to elimination of electromagnetic influences.

Those skilled in the art will readily observe that numerous modifications and alterations of the device and method may be made while retaining the teachings of the invention.

What is claimed is:

1. A method for reducing data transitions of a transmission end in a data transmission interface, the data transmission interface utilized for transmitting a plurality of data bits simultaneously, the method comprising:

receiving first data and second data having a plurality of data bits, respectively, the first data being data transmitted by the transmission end of the data transmission interface and the second data being next data of the first data in a timing sequence;

comparing corresponding data bits of the first data and the second data to compute a number of data bits undergoing data transition between the first data and the second data;

checking if the number of data bits undergoing data transition between the first data and the second data is greater than half the number of the plurality of data bits to determine a voltage level of a control signal;

activating an encoding mode to encode the plurality of data bits of the second data when the voltage level of the control signal conforms to a first voltage level; and outputting an encoding result corresponding to the second data to the transmission end.

2. The method of claim 1, wherein checking if the number of data bits undergoing data transition between the first data and the second data is greater than half the number of the plurality of data bits to determine the voltage level of the control signal comprises:

transitioning the control signal to a high logic level when the number of data bits undergoing data transition between the first data and the second data is greater than half the number of the plurality of data bits.

3. The method of claim 1, wherein checking if the number of data bits having data transition between the first data and the second data is greater than half of the number of the plurality of data bits to determine the voltage level of the control signal comprises:

transforming the control signal to a low logic level when the number of data bits undergoing data transition between the first data and the second data is less than half the number of the plurality of data bits.

4. The method of claim 1, wherein the first voltage level is a high logic level.

5. The method of claim 1, wherein activating the encoding mode to encode the plurality of data bits of the second data comprises:

performing an inverse operation for the plurality of data bits of the second data to output the encoding result.

6. The method of claim 1, wherein the data transmission interface is a mini low voltage differential signal (mini-LVDS) interface.

7. The method of claim 1, wherein the data transmission interface is a reduced swing differential signal (RSDS) interface.

8. An electronic device for reducing data transitions of a transmission end in a data transmission interface, the data transmission interface being utilized for transmitting a plurality of data bits simultaneously, the electronic device comprising:

a data output terminal for outputting first data, the first data being data being transmitted by the transmission end of the data transmission interface and comprising a plurality of data bits;

a data input terminal for receiving second data, the second data being next data of the first data in a timing sequence and comprising a plurality of data bits;

a comparison unit, coupled to the data output terminal and the data input terminal, for comparing corresponding data bits of the first data outputted by the data output terminal and the second data received by the data input terminal to compute a number of data bits undergoing data transition between the first data and the second data;

a determination unit, coupled to the comparison unit, for checking if the number of data bits undergoing data transition between the first data and the second data is greater than half of the number of the plurality of data bits to determine a voltage level of a control signal; and an encoding unit, coupled to the data input terminal, the determination unit and the data output terminal, for activating an encoding mode to encode the plurality of data bits of the second data when the voltage level of the control signal conforms to a first voltage level.

9. The electronic device of claim 8, wherein the determination unit transitions the control signal to a high logic level when the number of data bits undergoing data transition between the first data and the second data is greater than half the number of the plurality of data bits.

10. The electronic device of claim 8, wherein the determination unit transforms the control signal to a low logic level when the number of data bits undergoing data transition between the first data and the second data is less than half the number of the plurality of data bits.

11. The electronic device of claim 8, wherein the first voltage level is a high logic level.

12. The electronic device of claim 8, wherein the encoding unit performs an inverse operation for the plurality of data bits of the second data to output the encoding result when the encoding mode is activated.

13. The electronic device of claim 8, wherein the data transmission interface is a mini low voltage differential signal (mini-LVDS) interface.

14. The electronic device of claim 8, wherein the data transmission interface is a reduced swing differential signal (RSDS) interface.

* * * * *